No. 852,880. PATENTED MAY 7, 1907.
O. F. JORDAN.
RAILROAD SPREADER.
APPLICATION FILED NOV. 14, 1906.

WITNESSES.

INVENTOR.
OSWALD F. JORDAN
BY
ATTY.

No. 852,880. PATENTED MAY 7, 1907.
O. F. JORDAN.
RAILROAD SPREADER.
APPLICATION FILED NOV. 14, 1906.

WITNESSES.
INVENTOR.
OSWALD F. JORDAN.
BY
ATTY.

No. 852,880. PATENTED MAY 7, 1907.
O. F. JORDAN.
RAILROAD SPREADER.
APPLICATION FILED NOV. 14, 1906.

WITNESSES.
Arthur L. Slee.
John R. Lefevre.

INVENTOR.
OSWALD F. JORDAN.
BY
ATTY

No. 852,880. PATENTED MAY 7, 1907.
O. F. JORDAN.
RAILROAD SPREADER.
APPLICATION FILED NOV. 14, 1906.

WITNESSES.
INVENTOR
OSWALD F. JORDAN.
BY
ATTY.

No. 852,880. PATENTED MAY 7, 1907.
O. F. JORDAN.
RAILROAD SPREADER.
APPLICATION FILED NOV. 14, 1906.

WITNESSES.
Arthur L. Slee.
John R. Lepore.

INVENTOR
OSWALD F. JORDAN.
BY
ATTY.

UNITED STATES PATENT OFFICE.

OSWALD F. JORDAN, OF CHICAGO, ILLINOIS.

RAILROAD-SPREADER.

No. 852,880. Specification of Letters Patent. Patented May 7, 1907.

Application filed November 14, 1906. Serial No. 343,431.

*To all whom it may concern:*

Be it known that I, OSWALD F. JORDAN, a citizen of the United States, and a resident of Chicago, Cook county, Illinois, have invented a certain new, useful, and Improved Railroad-Spreader, of which the following is a full, clear, and exact description, such as will enable others skilled in the art to which it appertains to make and use the same.

My invention relates to improvements in machines for constructing railways and has particular reference to improvements in spreaders, a class of machines which are used for distributing ballasting materials and surfacing road beds or ways.

The object of my invention is to provide an improved railroad spreader adapted to run upon a railroad track and which shall be provided with wings or scrapers that shall be vertically and laterally adjustable in such manner as to assure and facilitate the proper performance of the work upon the roadway.

Further and special objects of my invention are to provide a spreader of the foregoing description which shall have means for clearing the rails as well as the roadway of obstructing, ballasting material;—which shall be provided with means for readily raising and lowering its main wings, and for holding the main wings in working position; which shall be provided with main wings, capable of adjustment to any of the required positions made necessary by roadways, embankments and cuts of various forms; which shall be provided with independently operable main and auxiliary wings or scrapers; which shall be provided with automatically operable but manually controlled means for swinging and operating the main and auxiliary wings, to project or retract the same;—which shall be provided with improved adjustable wing braces;—and, which may be controlled and operated by men riding on the machine, a distinct purpose of the invention being to provide a spreader which shall be as nearly as possible automatic in all of its operations.

Still further objects of my invention will appear hereinafter.

My invention consists generally in a railroad spreader of the construction and combination of parts hereinafter described and particularly pointed out in the claims.

My invention will be more readily understood by reference to the accompanying drawings, forming a part of this specification and in which.

In general appearance my railroad scraper resembles an ordinary flat car, being, however, of less width and having a super-structure. Because of this resemblance and to simplify the description of the machine I shall refer to the same as comprising a car and auxiliaries, which latter limit its use to the uses of a railroad spreader or scraper. A locomotive is used for moving the spreader along the track, and the car, being propelled, its wings clear the track and level or finish the surface of the ground on opposite sides thereof. The car may be constructed of either wood or metal, or may be a composite wooden and metallic structure.

Figure 1:
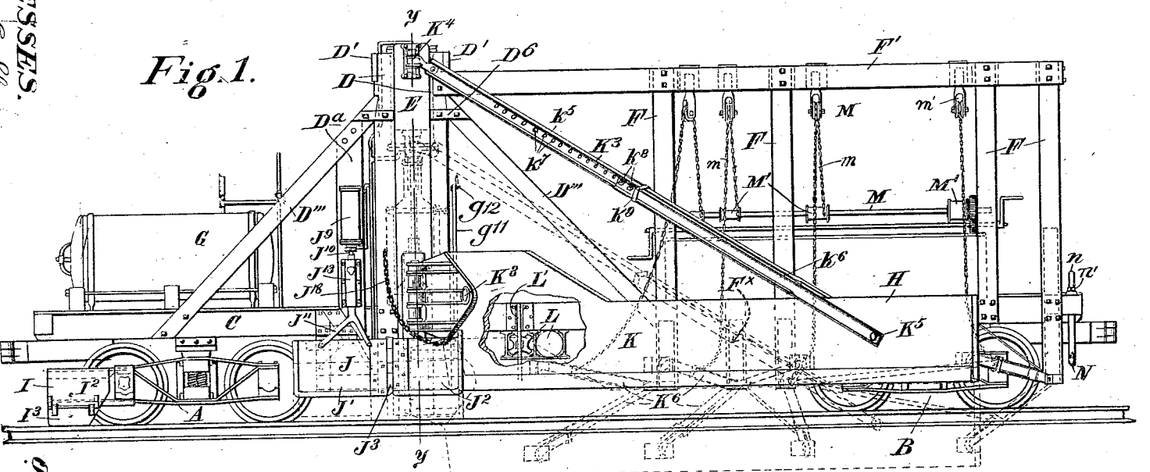
Figure 1 is a side elevation of a railroad spreader embodying my invention.
Figure 4:
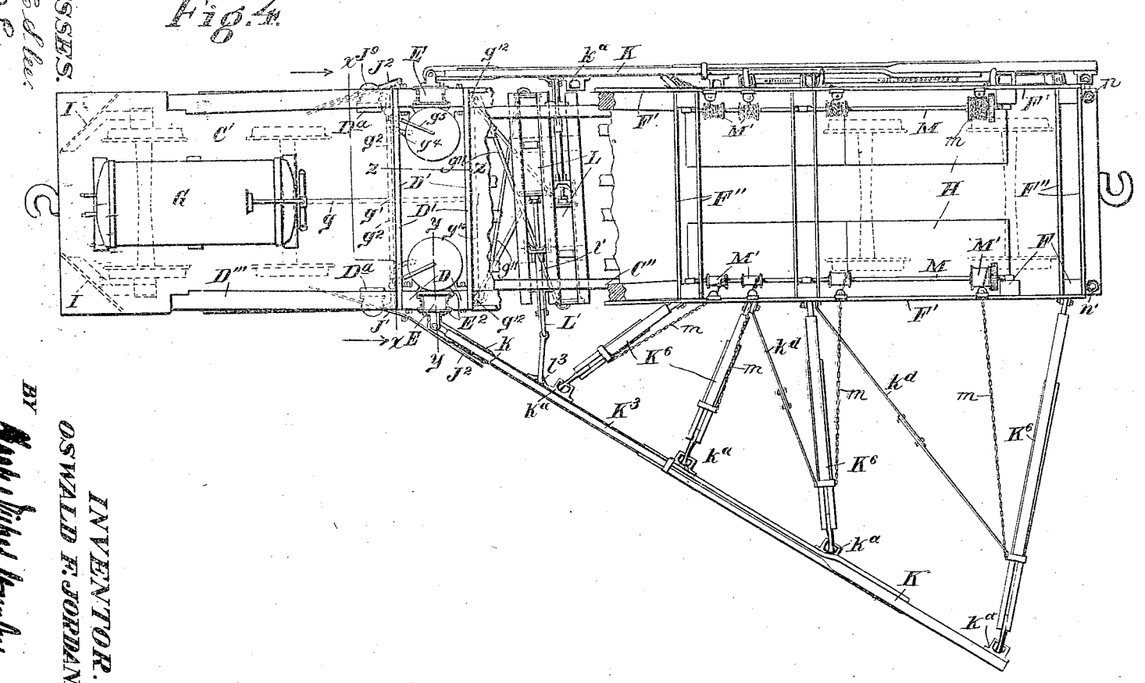
Fig. 4 is a plan view of the machine, the wings on one side thereof being distended and those on the other side being closed or retracted.

Referring to the drawings A and B represent the trucks. These may be ordinary four wheeled rigid frame trucks of usual design. They support the underframe C, of usual construction or design, but narrower than a freight car. The car floor C' is laid upon the underframe and preferably extends from end to end thereof. The superstructure comprises suitably braced columns D—D for guiding the wing posts E and a number of side posts or stanchions F—F, connected by longitudinal and transverse beams F' and F''. The columns D extend to within a short distance of the rail. They are secured to the side sills C'' of the underframe, and are additionally fastened by cross bars or beams D', at the top and by braces D'' at the bottom as well as by the slanting braces D'''. The braces D'' are of peculiar form. It will be noted that each brace comprises a single flanged bar or beam having inclined ends and a straight middle portion, and that the latter is secured to both of the center sills of the car. These braces take the thrust of the wing upon the columns and serve to transmit the same to the principal members of the underframe. Certain of the stanchions F likewise extend below the underframe and the several pairs thereof are joined beneath the underframe by suitable braces like those above described. In addition to the long stanchions F, I preferably employ two short stanchions $F^x$ (see dotted lines Fig. 1), between forward stanchions F—F and preferably connected thereto. The lower ends of the long and short stanchions provide the needed number of points of attachment for the wing braces or struts hereinafter described, as best shown in Figs. 1 and 4.

The several parts of the car are not limited to exact proportions, but I prefer to locate the columns D just back of the forward truck A, and these dominate the design, the distance from the columns to the rear end of the car being substantially the measure of the length of the main spreader wings.

The free forward end of the car deck or floor is occupied by the compressed air or steam reservoir G or receiver, from whence the several cylinders are supplied by a system of piping and valves, hereinafter described. The space between the stanchions at the rear end of the car is partly occupied by dunnage chests H.

Figures 2, 3:
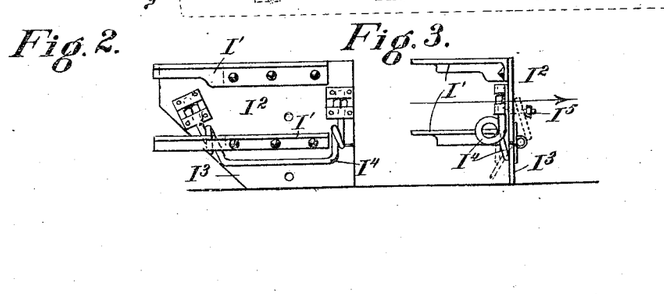
Figs. 2 and 3 are, respectively, an inner side view and an edge view of one of the flangers or rail scrapers used on the forward truck of my machine.

The ballast cars which usually precede a spreader, drop the gravel or other material upon the ties and at the sides of the track and frequently the rails are obstructed. To dispose of the obstructing material and clear the way for the spreader, I provide my machine with two small front scrapers or flangers I—I, secured upon the frame of the front truck. Angular bars I', extending from the truck frame, carry the angularly positioned scrapers I. Each comprises an upper portion $I^2$, fixed to the said bars I', and a lower swinging portion $I^3$, which preferably contacts the rail. These parts are joined by a suitable hinge and the part $I^3$ is adapted to yield if it strikes a heavy stone or other obstruction on the track; its yielding motion, however, is limited by a heavy spring, $I^4$, provided on the back of the member $I^2$. When the spreader is run backwardly the hinged part, $I^3$, trails along the rail. Though it is desirable that the device shall be adapted to yield slightly on striking a stone or light obstruction on the track, my principal purpose in so constructing it, is to avoid breaking the scraper when passing over frogs or switches in the track, some of which are higher than the main rails. When the device is not in use the part, $I^3$, is turned up and secured by a short bolt $I^5$, passing through both members as shown in Figs. 2 and 3.

Any material present on the track will be dislodged by the flangers or spreaders, I, which cross the rails and will be pushed outward beyond the reach of the car trucks. From these points it will be further dislodged by a second pair of spreader plates or wings, J—J, the inner ends of which are almost directly above or beside the rails. These plates not only serve the purpose stated, but also serve to close the gaps between the sides of the car and the inner ends of the main wings, K.

Figure 15:
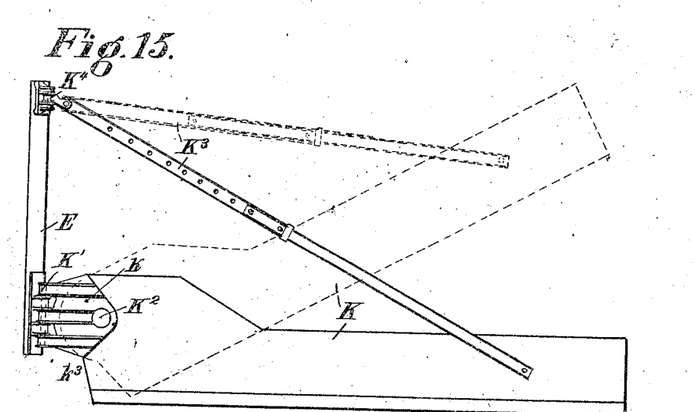
Fig. 15 illustrates the adjustability of the main wings.
Figure 16:
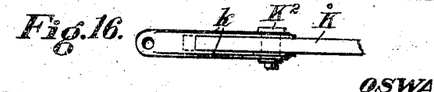
Fig. 16 is an enlarged plan or top view of the main wing hinge member.

The wings upon one side of the car are exactly like those on the other, hence a description of the devices on one side will serve for all. Referring to Figs. 1, 4, 6, 8, 9, and 10, it will be seen that the spreader wing, J, is made up of fore and aft plates, $J^1$—$J^2$, joined by a vertical hinge, $J^3$. The member, $J^1$, is guided by vertical bars, $J^4$—$J^4$, which hang down from the underframe C, guide blocks or straps, $J^5$, being provided on the rear side of the plate $J^1$. I thus adapt the plate for vertical movement in order that it may be lowered to the work or raised to the position shown in Fig. 1, when not being used. The plate is strengthened and braced by two links $J^6$—$J^6$, loosely secured to a flange, $J^7$, on the lower edge of $J^1$, and at their opposite ends secured to a depending brace or bracket, $J^8$ on the underframe. These devices prevent the collapse of the plate, but allow it to be raised and lowered freely. (See Figs. 6 and 8). For raising and lowering the plate or wing, J, I employ an air or steam engine, $J^9$, comprising a cylinder secured to the false column, $D^a$, a piston therein, not shown, and a piston rod $J^{10}$, which is connected to the wing by a fork, $J^{11}$. Suitable valved pipes are connected to the cylinder, $J^9$, for admitting and exhausting air or steam thereto, whereby the wing may be raised or lowered. If found desirable, the pressure of air in the cylinder may also be employed to hold the wing down to its work (in the position shown in Figs. 4 and 8). I prefer to interpose a cross head $J^{12}$ between the piston rod $J^{10}$ and the fork $J^{11}$. This operates in a box-like guide $J^{13}$ on the post $D^4$. The fork contains a hole $J^{14}$ and holes $J^{15}$ are provided in the guide $J^{13}$ to receive a pin $J^{16}$, for supporting the wing in raised position. To prevent loss of the pin, I connect it to the frame of the car by a short chain and to prevent dislodgment of the pin from the position shown in Fig. 10, I preferably provide the pin with an enlarged end $J^{17}$, which, passing through the large portions of the holes $J^{15}$ drops into the smaller lower parts of said openings. The pin when thus placed cannot be removed until the wing and fork are first slightly elevated, to aline the holes, $J^{14}$ and $J^{15}$. When lowered, the wing, J, is supported by a stop bar, $J^{4'}$, on the lower ends of the parts, $J^4$. The strain upon the after section $J^2$, when at work, is relieved by a chain or a cord, $J^{18}$, attached thereto and to the column, D, (see Fig. 1), supporting the rear end of the wing, $J^2$, in its lowered position. The section or member, $J^2$, is used in the position shown in Fig. 1 and at the open wing side of Fig. 4. When not in use the section, $J^2$, is folded forward against the section, $J^1$, to reduce the overall width of the car, as shown at the closed wing side of Fig. 4. It will be observed that when at work the hinged section of the spreader wing, J, rests against the inner end of the open main wing, K. (See Figs. 4 and 6). The main wing, K, is hinged upon the vertically movable post, E. In addition to its vertical pivot, $K^1$, it is provided with a horizontal pivot, $K^2$, which permits it to be raised in an inclined position as shown in Fig. 15. Obviously the rear end of the wing may be dropped below a horizontal line. The rear end of the wing is held at the desired elevation by the strut bar or link, $K^3$, extending from the hinge, $K^4$, at the upper end of the post, E, to a pivotal fastening, $K^5$, near the rear end of the wing. When in use the wing forms an acute angle with the side of the car and is held in such position by a plurality of lateral braces or struts, $K^6$, of different lengths. When the struts are raised or removed the wing may be swung back against the side of the car as shown in the upper side of Fig. 4, and also in Fig. 5. The wing, K, is of great weight and instead of relying upon manual force to project and retract it, I employ an engine, L, arranged beneath the underframe and connected with the wing by a plurality of levers hereinafter more fully described.

The columns, D, form guides for the sliding post, E, to which, as explained, the main wing is hinged. When these parts are made of wood, I prefer to sheath their engaging surfaces with metal. The post is provided with flanges, $E''$—$E''$, which engage the columns, D, and slidably interlock the post therewith. The upper ends of the columns, D—D, are connected by a strong tie bar, $D^b$, which also serves to bind the upper ends of the braces, $D'''$. They are further secured by lugs or feet on the large cylinder, $E'$. This cylinder is the principal part of the air or steam engine, which I employ for raising and lowering the main wing. The piston, $E''$, within the cylinder, $E'$, is connected to the post, E, by a piston rod, $E'''$, and a bracket, $E^4$. Upon the admission of compressed air or steam to the lower end of the cylinder, the post, E, and the main wing, will be elevated and when the pressure of air or steam is reversed the main wing will be depressed. It is possible to hold the wing at the proper working height by maintaining suitable pressure in the cylinder, $E'$, but I much prefer to provide positive means, for securing the wing at the proper height. Accordingly, upon the inner faces of the columns, D, I provide a pair of angle irons or members, $D^4$, and in these a plurality of holes, $d^4$. The members, $D^4$, are arranged on opposite sides of the bracket, $E^4$, and after the wing is raised a pin, $d^5$, is inserted in the holes beneath the cross head, $E^4$, at the proper height. The cross head, $E^4$, is then lowered upon the pin, $d^5$, and in this manner the pin, $d^5$, supports the post, E, and the wing, K. In spreading heavy materials it is advantageous to hold the wing down to its work, and this may be done by means of the engine, E, pressing the supporting bracket against the pin, $d^5$.

The lower end of the post, E, is provided with a large wing hinge, $K^7$. The portion of the hinge which is attached to the wing consists in a bifurcated member presenting broad flat sides, $k$—$k$, to the opposite sides of the wing, K. These parts, $k$—$k$, are strengthened by a plurality of ribs, $k'$. A large pivot pin, $K^2$, passing through the members, $k$—$k$, and through end of the wing, K, securely attaches the latter to its hinge. The broad hinge members, $k$—$k$, prevent lateral play or torsion of the wing, holding it rigidly upright.

Figure 7:
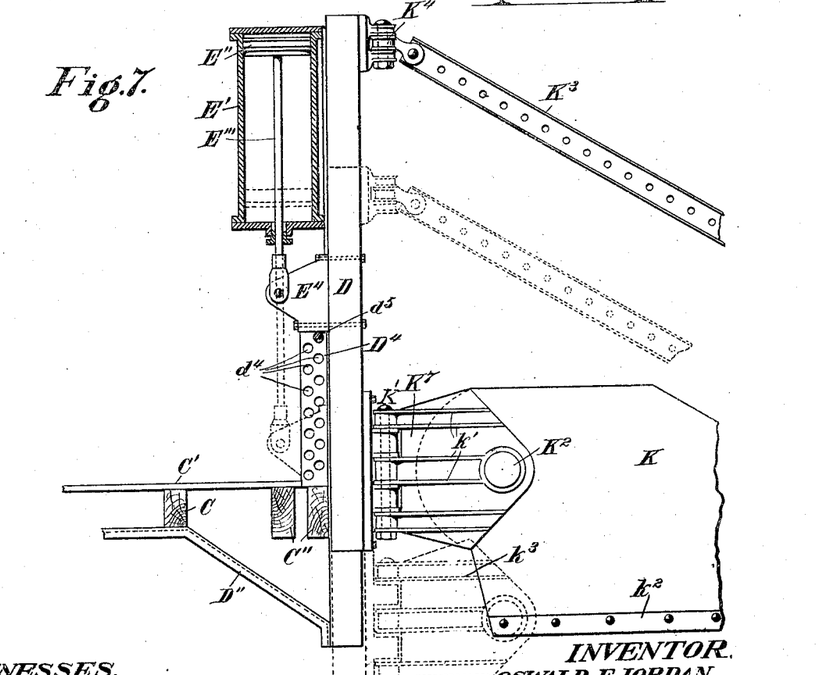
Fig. 7 is a similarly enlarged sectional view, substantially on the lines Y—Y of Figs. 1 and 4.
Figures 8, 9, 10, 11, 12:
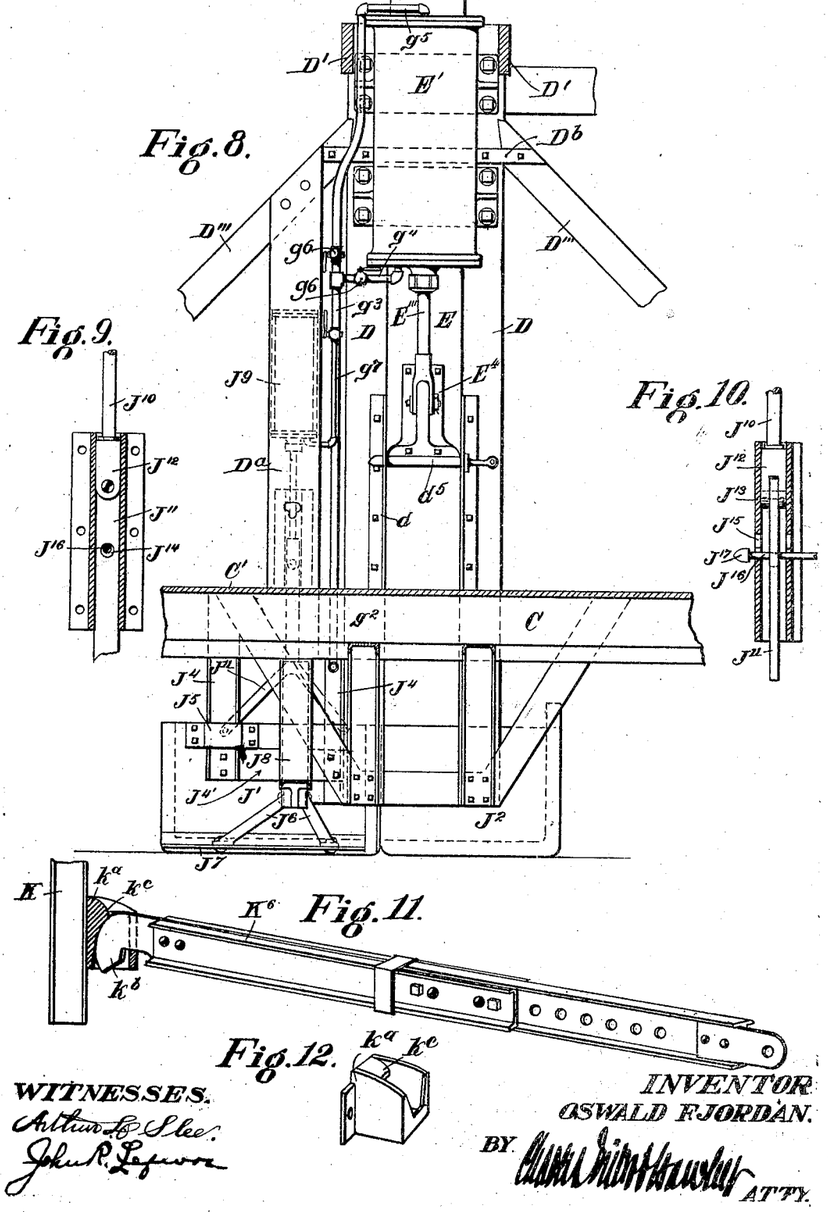
Fig. 8 is an enlarged sectional detail on the lines Z—Z of Figs. 4 and 6.
Figs. 9 and 10 are sectional details of the cross head guide and means for securing the small or auxiliary side wing, shown particularly in Figs. 6 and 8.
Fig. 11 is a perspective view of one of the main wing braces, the socket on the main wing being shown in section.
Fig. 12 is a perspective view of said socket.
Figure 13:
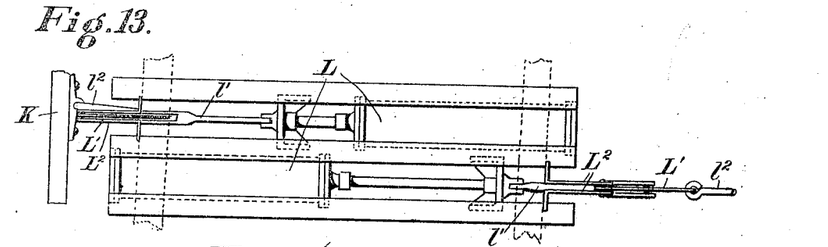
Fig. 13 is an enlarged plan view of the devices used for swinging the main wings, shown also in Fig. 4.
Figure 14:
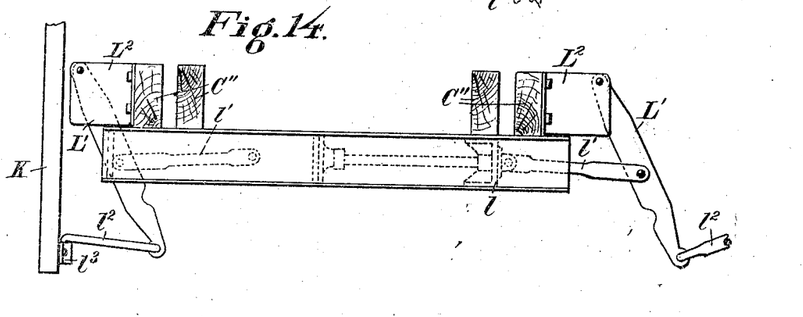
Fig. 14 is a front side view of the mechanism shown in Fig. 13.

The wing, K, is preferably formed of wood and faced with sheet metal. An additional protection is provided along its lower edge in the form of a metal shoe, $k^2$. The inner or forward end of the wing is of greater width or depth than the remainder of the wing. The wing encounters the greater bulk of the loose material at this point, and consequently the materials pile up against the wing at its inner end, but as it is gradually leveled out it is reduced in depth until toward the outer end of the wing it reaches a minimum. Hence the inner end of the wing is made of considerable height to prevent the material from passing over the top thereof. Further, the greater width of the wing at its pivotal end gives greater strength and rigidity to the structure and also permits the hinge to be arranged at a high point on the car. The lower portion of the inner end of the wing is cut away at $k^3$ (see Fig. 7), to permit the outer end of the wing to be lowered below its horizontal position and to avoid the cross ties of the track.

The wing supporting bar, $K^3$, is hinged to the top of the post, E, and in order that the wing may be swung vertically upon the pivot $K^2$, the bar $K^3$, is made adjustable. The preferred construction of this bar is illustrated in the drawings. In its preferred form it consists of telescoping members, $k^5$—$k^6$. The member $k^5$, is an I beam pivotally connected to the hinge, $K^4$, and provided with a plurality of bolt holes, $k^7$. The member, $k^6$, comprises two channel beams pivotally connected to the wing, K, at $K^5$. The upper end of the part, $K^6$, is held between the upper and lower flanges of the I beam, $k^5$, and is secured by a pair of bolts, $k^8$. A short sleeve, $k^n$, preferably attached to the end of the member, $k^5$, surrounds the members $k^5$—$k^6$ at or near the point at which they are connected. By changing the positions of the bolts, $k^8$, in the holes, $k^7$, the bar, $K^3$, as a whole may be shortened or lengthened as desired.

The inner face of the wing, K, is provided with a plurality of socket members $k^a$, to receive the ends of the struts, $K^6$, which take up the thrust upon the wing, K. As the outward swing of the wing, K, is variable, the struts, $K^6$, are made adjustable in length, like unto the bar, $K^3$. The inner ends of the struts, $K^6$, are pivoted on the stanchions, F, and at their outer ends are provided with hooks $k^b$, adapted to enter the sockets, $k^a$, on the main wing. To prevent dislodgment of the hooked end of the struts from the socket members, while the machine is in service, each socket member is provided with an overhanging shoulder, $k^c$, which interlocks with the hook, $k^b$, when the latter is inserted in the socket. The thrust of the wing upon the struts serves to tighten the socket and hook connections.

Figure 5:
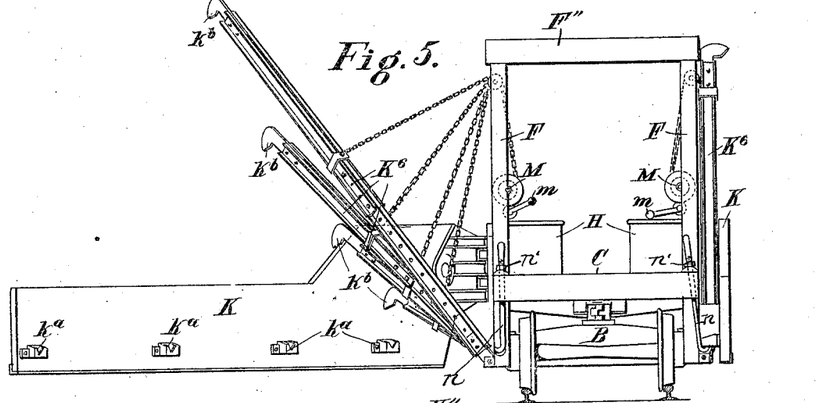
Fig. 5 is a rear end view or elevation of the machine showing the manner of lowering the braces into engagement with a main wing, or disengaging the same therefrom.
Figure 6:
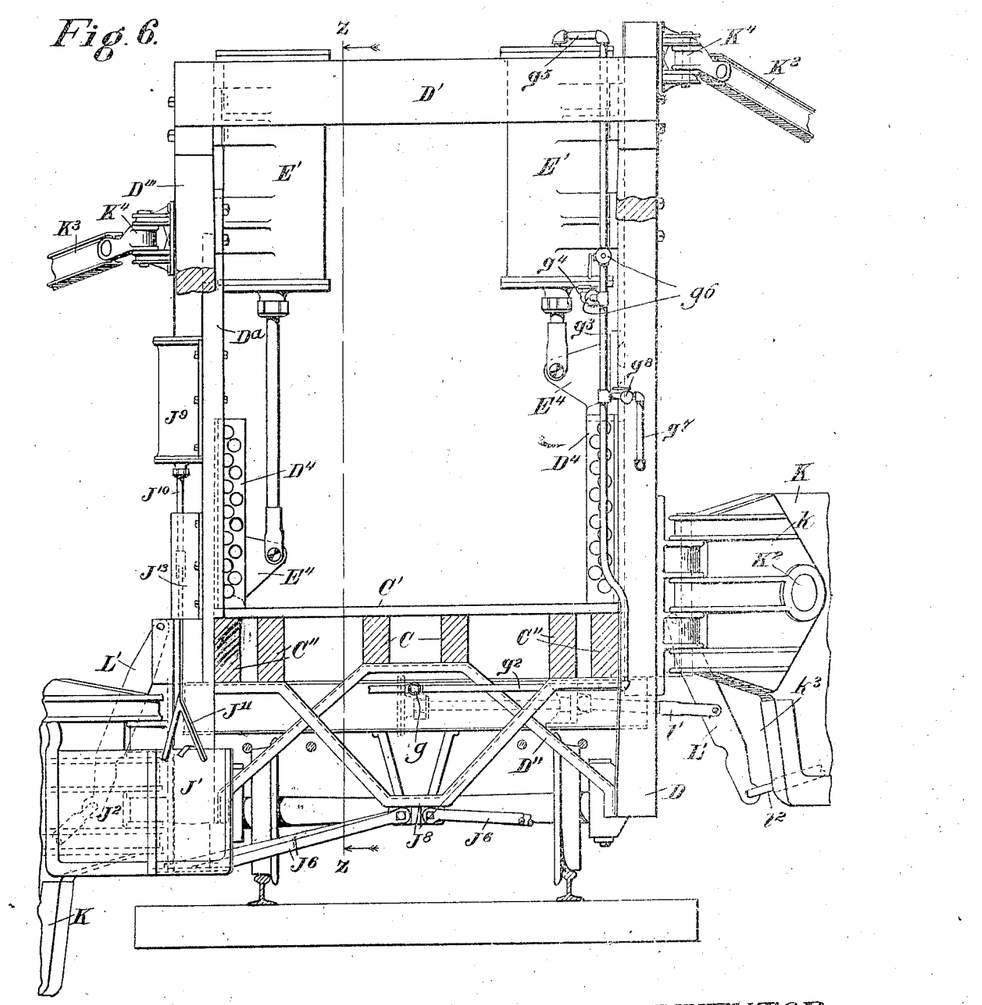
Fig. 6 is an enlarged transverse, vertical section substantially on the line X—X of Fig. 4, viewed in the direction of the arrows and showing a pair of spreader wings in working position, while the opposite main wing is in non-working position.

M, represents a shaft mounted in bearings on the stanchions, F, and adapted to be operated by either of two cranks, geared thereto, as shown in Fig. 1. This shaft carries a number of drums, M', of different diameters. To these I attach chains, m, which, passing through blocks, m', hanging from the beam, F', descend to the outer ends of the struts or wing braces, $K^6$. As explained, the struts, $K^6$, are pivoted or hung on the sides of the car and when it is desired to either raise or lower the same, the windlass shaft is turned. The parts are so proportioned that the struts will fold upwardly against the sides of the car simultaneously and when lowered will drop into engagement with the wing sockets successively, after the manner indicated in Fig. 5. Likewise they are detached from the wing successively by the first few revolutions of the windlass. In lowering the struts into operative position, the short forward struts readily drop into their respective sockets, as on account of their short length, they are guided by their hinges. The longer struts are not so readily guided by their hinges and are therefor provided with additional brace bars or members, $k^d$, the man stationed on the car properly positioning each strut as it is lowered.

As before stated, the wings K, are swung inwardly and outwardly by engines, L, each wing being provided with its own actuating engine. Interposed between each engine cylinder, L, and its respective wings are a plurality of levers so arranged as to give maximum movement to the wings with minimum piston movement. L' indicates a lever pivoted upon suitable brackets, $L^2$, attached to the side sills, C''. The cross head, l, of the engine is connected to the lever, L', at about its middle point by a pitman, l'. To the outer end of the lever, L', is pivoted a horizontal lever, $l^2$, having its outer end connected to the wing, K, by a socket, $l^3$. It is evident from this construction that comparatively small movement of the cross head, l, will impart considerable movement to the wing, K.

As shown in Fig. 4, I prefer to arrange the engines, L, angularly upon the underframe, C, to the end that the operating levers may be connected to the wings, K, at equal distances from the hinges thereof.

For holding the wings in closed position and for supporting them when not in use, I employ a hook, n, on the end sill of the car. When the wing is swung against the side of the car, as shown in Fig. 4, the hook is placed in end socket thereof and is then drawn up tightly by means of the nut, n', on its upper end, thereby rigidly securing the wing to the car.

The various engines or operating cylinders are all connected by suitably valved pipes to the pressure tank G, and are so arranged that all may be operated from about the same place on the car. I find the system of piping and arrangement of valves illustrated in the drawings, convenient. As illustrated, g, indicates the main pipe from the reservoir or tank, G.

At g' branch pipes, $g^2$, lead to the opposite sides of the car to supply the cylinders, $J^9$ and $E^1$. The pipes, $g^2$, are turned up vertically as at $g^3$, terminating in branches, $g^4$, $g^5$, which connect the lower and upper ends of the cylinder E'. Three way valves, $g^6$, control the pipes $g^4$, $g^5$. A smaller pipe, $g^7$, controlled by a valve $g^8$, leads from the stand pipe, $g^3$, to the small cylinder $J^9$. Another pipe, $g^{10}$, supplies pipes $g^{11}$ which lead to the opposite ends of the cylinders, L. Suitable four way valves, $g^{12}$, are located in said pipes, $g^{11}$, and by operating these the wings may be moved at will.

The operation of my invention is usually as follows: When the car is being moved from point to point on the railroad the wings, K and J are folded against the sides of the car and are held also in their raised positions. Upon arrival at the point where the work is to be done the wings are freed. The first operation consists in adjusting the main wings at the angles at which they are to work. This is accomplished by blocking up the rear ends of the wings, and then either elevating or depressing the hinged ends thereof by means of the engines, E'. The wings are then secured by proper adjustment of the top struts or braces, $K^3$. This having been accomplished air is admitted to the cylinders of the wing actuating engines, L, and the same are thereby projected, leaving room for the descent of the lateral struts, $K^6$. The operator then frees the windlass, M, and permits the struts to fall. The shortest strut falling into the socket on the main wing fixes the position of the latter and hence the longer struts readily fall into place. The particular angle at which the main wing is to work is fixed by adjusting the length of the lateral struts, $K^6$. The hinged members of the wings or plates, J, are then turned back against the main wings. The operator next fixes the wings J at the height at which they are to work, that is, the stop pins, $J^{16}$, belonging to the wings, J, are removed and said wings are permitted to drop. They are stopped with their lower edges just above the ties of the track. The main wings are usually dropped to the position shown by dotted lines in Fig. 1, with their lower edges considerably below the level of the ties. The exact depth of cut is determined by the positions of the stop pins, $d^5$, on the columns, D. The hinged members of the flanges or scrapers, I, are next loosened and dropped as shown in Fig. 1. The machine, then being in readiness for work, is moved forward against the obstructing ballast or other material upon and along the side of the track, sweeping the same aside. The engines, $J^6$ and E' enable the operator to quickly raise the wings, J and K, when necessary; as in passing over crossings or like obstructions, and if it becomes necessary the operator may employ either of the engines, as a means to press the respective wings downward.

As various modifications of my invention will readily suggest themselves to one skilled in the art, I do not confine the invention to the specific constructions herein shown and described.

Having thus described my invention, I claim as new and desire to secure by Letters Patent:

1. The railroad spreader herein described, comprising a car, in combination with a vertically movable post on the side thereof, a spreader wing hinged on said post, means for holding said wing distended, and fluid pressure means for pressing said post and wing downward and for raising the same, substantially as described.

2. The railroad spreader herein described, comprising a car, in combination with a wing normally occupying an angular position with relation to the side of the car, said wing being vertically movable, an adjustable stop for said wing and means for pressing said wing downward against said stop, substantially as described.

3. The railroad spreader herein described, comprising a car, in combination with a spreader wing, normally occupying an angular position with relation to the side of the car and fluid pressure means for pressing said wing downwardly while at work and for raising the same, substantially as described.

4. The railroad spreader herein described, comprising a car, in combination with a vertically movable post on the side thereof, a wing hinged on said post, wing struts, an adjustable stop for said post and means for pressing the post against said stop and for raising the same, substantially as described.

5. The railroad spreader herein described, comprising a car, in combination with a post suitably held and vertically movable at the side of the car, a wing having a right angled hinge connecting its inner end with said post, an adjustable strut extending from the outer end of said wing to the said post, for holding said outer end down to its work, fluid pressure means for pressing said post and the inner end of said wing downwardly, to adjust the wing in inclined position, or hold the inner end of the wing down to its work and suitable lateral struts, substantially as described.

6. The railroad spreader herein described, comprising a car, in combination with a vertically movable post on the side thereof, a wing hinged on said post, means for holding said wing distended, fluid pressure means for raising and lowering and holding said post and wing, and other means for securing the same when positioned, substantially as described.

7. The railroad spreader herein described, comprising a car, in combination with a vertically movable post on the side thereof, guides or columns for said post, a wing hinged on said post, means for holding said wing distended, fluid actuated means for raising and lowering said post, and suitable parts on said columns for supporting said post and wing when properly positioned, substantially as described.

8. The railroad spreader herein described, comprising a car, in combination with a vertically movable post on the side thereof, a wing hinged on said post, means for holding said wing distended, means for raising said post and wing to desired position and a single adjustable strut or link extending between the upper end of said post and the outer end of said wing, for holding the latter down to its work, substantially as described.

9. The railroad spreader herein described, comprising a car, in combination with a vertically movable post on the side thereof, a wing hinged at or near the bottom of said post and adapted to swing both horizontally and vertically, means on the car for holding said wing in any position to which it may be adjusted, a pressure cylinder on the car a piston therein and a piston rod connected to said post for raising and lowering said post and wing, substantially as described.

10. The railroad spreader herein described, comprising a car, in combination with a vertically movable post on the side thereof, a wing hinged at or near the bottom of said post and adapted to swing both horizontally and vertically, means for holding said wing in any position to which it may be adjusted, fluid actuated means for raising and lowering said post and wing, and fluid actuated means for opening and closing said wing, substantially as described.

11. The railroad spreader herein described, comprising a car and its trucks, in combination with depending columns thereon, a wing vertically movable on said columns beneath the car, fluid actuated means for raising and lowering said wing and a stop pin for securing said wing in raised position, substantially as described.

12. The railroad spreader herein described, comprising a car, and its trucks in combination with a vertically movable wing, beneath the car and having a vertically hinged rear section, means for raising and lowering said wing as a whole and for supporting it in raised position, substantially as described.

13. The railroad spreader herein described, comprising a car, in combination with a vertically movable wing, having a vertically hinged rear section, means for raising and lowering said wing and for supporting it in raised position and auxiliary means for supporting the hinged section when lowered, substantially as described.

14. The railroad spreader herein described, comprising a car, in combination with depending columns or bars, a wing J inclined with respect to the car and movable on said columns beneath the car, pivotal braces J" connecting said wing with the underframe of the car and means for raising and lowering said wing, substantially as described.

15. The railroad spreader herein described, comprising a car, in combination with a spreader wing, a vertically movable post whereon the same is hinged, pivotal struts also connecting the wing with said car, said struts being pivotally connected with said wing and means for raising said struts independently of the wing, substantially as described.

16. The railroad spreader herein described, comprising a car, in combination with a vertically movable wing hinged thereto, suitable lateral struts for said wing, means for sustaining the rear end of said wing and means upon the car for projecting said wing, substantially as described.

17. The railroad spreader herein described, comprising a car, in combination with a vertically movable wing hinged thereto, suitable lateral struts for said wing, means for sustaining the rear end of said wing, means upon the car for projecting said wing and for retracting the same, substantially as described.

18. The railroad spreader herein described, comprising a car, in combination with a vertically movable post on the side thereof, a wing hinged upon and suspended from said post, suitable means for raising and lowering said post and means upon the car for projecting and retracting said wing, substantially as described.

19. The railroad spreader herein described, comprising a car, in combination with a vertically movable post on the side thereof, a wing hinged upon and suspended from said post, suitable means for raising and lowering said post and fluid actuated means upon the car for projecting and retracting said wing, substantially as described.

20. The railroad spreader herein described, comprising a car, in combination with a vertically movable post on the side thereof, a hinge on said post at or near the bottom thereof, a wing pivoted upon said hinge, a telescopically adjustable support connecting the outer end of said wing to the upper end of said post, means for holding said wing distended and means for raising and lowering said post and wing, substantially as described.

21. The railroad spreader herein described, comprising a car, in combination with a vertically movable post on the side thereof, a hinge on said post at or near the bottom thereof, a wing pivoted upon said hinge, a telescopically adjustable support connecting the outer end of said wing to the upper end of said post, pivotal lateral struts for said wing and means for raising and lowering said post and wing, substantially as described.

22. The railroad spreader herein described, comprising a car, in combination with a vertically movable post on the side thereof, a hinge upon the lower part of said post, said hinge comprising a part attached to said post and a bifurcated swinging member, a wing pivoted therein, an adjustable support for the outer end of said wing, means for holding 23. The railroad spreader herein described, comprising a car, in combination with a vertically movable post on the side thereof, a main wing hinged on said post, means for holding said wing distended, and a supplemental foldable wing adapted to close the gap between said post and the lower inner end of said main wing, substantially as described.

24. The railroad spreader herein described, comprising a car, in combination with a vertically movable post on the side thereof, a main wing hinged on said post, means for holding said wing distended, means for raising and lowering said post and wing, a supplemental wing adapted to close the gap between said post and the lower inner end of said main wing, internal braces for said supplemental wing, and means for raising and lowering said supplemental wing, substantially as and for the purpose described.

25. The railroad spreader herein described, comprising a car, in combination with a vertically movable post on the side thereof, a main wing hinged on said post, means for swinging said wing inwardly and outwardly, other means for raising and lowering said wing and means for holding said wing in distended position, substantially as described.

26. The railroad spreader herein described, comprising a car, in combination with a wing vertically hinged upon the side of said car, means upon the car for raising and lowering said wing, means for holding the wing distended and means also upon the car for swinging the same in a horizontal plane, when freed from the distending means, substantially as described.

27. The railroad spreader herein described, comprising a car, in combination with a vertically movable post on the side thereof, a wing hinged on said post, means for swinging said wing inwardly and outwardly, and adjustable means for holding said wing in distended position, substantially as described.

28. The railroad spreader herein described, comprising a car, in combination with a vertically movable post on the side thereof, a wing hinged on said post, means for swinging said wing inwardly and outwardly, and telescopically adjustable struts for holding said wing in distended position, substantially as described.

29. The railroad spreader herein described, comprising a car, in combination with a vertically movable post on the side thereof, a wing hinged on said post, means for swinging said wing in a horizontal plane, a plurality of members for holding said wing in distended position and means for raising said members out of engagement with said wing when desired to swing the same inwardly or outwardly, substantially as described.

30. The railroad spreader herein described, comprising a car, in combination with a spreader wing hinged upon the side thereof, means for raising and lowering said wing and for supporting the same in raised and lowered positions, lateral struts of different lengths pivotally connecting the car and wing and means for raising said struts out of engagement with said wing successively, substantially as described.

31. The railroad spreader herein described, comprising a car, in combination with a spreader wing hinged upon the side thereof, means for raising and lowering said wing and for supporting the same in raised and lowered positions, lateral struts of different lengths pivotally connecting the car and wing and means for raising said struts out of engagement with said wing successively and closing the same against the car simultaneously, substantially as described.

32. The railroad spreader herein described, having a spreader wing, in combination with means for raising and lowering said wing, pivotal struts for connecting the car and wing and means for engaging said struts with said wing successively, substantially as described.

33. The railroad spreader herein described, comprising a car, in combination with a vertically movable post on the side thereof, a wing hinged on said post, means for swinging said wing inwardly and outwardly, a plurality of struts pivoted to the side of said car and adapted to engage said wing to hold the same in distended position, a windlass and chains for disengaging said struts from said wing when it is desired to swing the latter, substantially as described.

34. The railroad spreader herein described, comprising a car, in combination with a vertically movable and horizontally adjustable spreader wing thereon, a plurality of inclined lateral struts extending between the wing and the car, said struts having socketed connections with said wing adapted to be tightened by the pressure of the wing against the struts, substantially as described.

35. The railroad spreader herein described, comprising a car, in combination with a vertically movable post on the side thereof, a wing hinged on said post, means for swinging said wing inwardly and outwardly, a plurality of struts pivoted to the side of said car, sockets upon the inner face of said wing, hooks upon the outer ends of said struts to engage said sockets and to hold the wing in distended position, substantially as described.

36. The railroad spreader herein described, comprising a car, in combination with a vertically movable post on the side thereof, a wing hinged on said post, a plurality of adjustable members for holding said wing in distended position, means for raising said members successively from engagement with said wing and folding the same simultaneously against the side of the car, substantially as described.

37. The railroad spreader herein described, comprising a car, in combination with a vertically movable post on the side thereof, a wing hinged on said post, a plurality of members pivoted to the side of said car, adapted to engage said wing to hold the same in distended position, a windlass upon said car, provided with a plurality of drums of different diameters, a hoisting cable connecting each said drum with one of said members and means for operating said windlass to disengage said members from said wing, substantially as described.

38. The railroad spreader herein described, comprising a car, in combination with a vertically movable post on the side thereof, a wing hinged on said post, means for swinging said wing inwardly and outwardly, means for holding said wing in distended position, means for disengaging the distending members from said wing, means for swinging the wing inwardly, and means for locking the same to the side of the car, when folded thereagainst, substantially as described.

39. The railroad spreader herein described, comprising a car, in combination with a vertical post on the side thereof, a main wing hinged on said post, a supplemental wing adapted to close the gap between said post and the lower inner end of said main wing, pivotal braces for said supplementary wing and means for raising and lowering said supplementary wing, substantially as described.

40. The railroad spreader herein described, comprising a car in combination with a vertically movable post on the side thereof, a main wing hinged on said post, means for swinging said wing inwardly and outwardly, a supplemental wing adapted to close the gap between said post and said main wing, means for operating said wings and means for controlling the vertical movement of both said wings and the horizontal swing of said main wing from substantially the same point on the car, substantially as described.

41. In a railroad spreader, the combination with a car, of a vertical post on the side thereof, a main wing hinged upon said post, means for maintaining said wing in distended position, and a supplementary two part foldable wing arranged to close the gap between said post and the wing hinged thereto, substantially as described.

42. In a railroad spreader, the combination with a car, of a vertical post on the side thereof, a main wing hinged upon said post, means for maintaining said wing in distended position, and a supplementary two-part wing arranged to close the gap between said post and the wing hinged thereto, said supplementary wing comprising a suitably braced portion and a rear portion vertically hinged thereto, substantially as described.

43. In a railroad spreader, the combination with a car, of a vertically movable post on the side thereof, a main wing hinged thereto, means for maintaining said wing in distended position, means for raising and lowering said wing, a supplementary wing arranged to close the gap between said post and the wing hinged thereto, and comprising a suitable braced member and a free member hinged thereto, and means for raising and lowering said supplementary wing independently of said main wing, substantially as described.

44. In a railroad spreader, the combination with a car, of a vertically movable post on the side thereof, a main wing hinged thereto, means for maintaining said wing in distended position, means for raising and lowering said wing, a supplementary wing arranged to close the gap between said post and the wing hinged thereto, and comprising a suitably braced member and a free member hinged thereto, means for raising and lowering said supplementary wing independently of said main wing and a suitable support for said hinged member when lowered into operative position, substantially as described.

45. In a railroad spreader, a car, in combination with a vertically sliding post, a wing hinged thereto, means for holding said wing in distended position, means for raising and lowering said post and wing, a suitable rest for the same when adjusted to the proper height, and means for exerting pressure upon said post; substantially as described.

46. In a railroad spreader, a car, in combination with a wing hinged to the side thereof, an engine for swinging said wing inwardly and outwardly, and suitable levers connecting the piston of the engine with said wings, substantially as described.

47. In a railroad spreader a car, in combination with a vertical sliding post thereon, a wing hinged to said post, means for raising and lowering said post and wing, an engine for swinging said wing inwardly and outwardly, a lever suspended from the underframing of said car, suitable connections between the piston of said engine, said lever and said wing; substantially as described.

48. In a railroad spreader, a car, in combination with a vertically sliding post arranged on the side thereof, a hinge at or near the lower end thereof, said hinge comprising a stationary part attached to said post and a swinging part, having two vertically disposed plate portions, a wing pivoted between said plate portions, the lower inner end of said wing being cut away and an auxiliary wing adapted to close the gap formed by cutting away said part of the wing; substantially as described.

49. In a railroad spreader, a car, in combination with parallel columns thereon, a post slidable between said columns and having flanges extending from top to bottom and engaged with said columns, a wing hinged upon said post, means for maintaining the wing in distended position, means for raising and lowering said post and wing; substantially as described.

50. In a railroad spreader, a car, in combination with a vertically sliding post arranged at the side thereof, columns arranged upon each side of said post, flanges extending from end to end of said post and slidably interlocking said post and columns, a wing hinged upon said post, vertical and lateral struts for maintaining said wing in distended position, and means for raising and lowering said post; substantially as described.

51. The herein described railroad spreader, comprising a car, in combination with parallel vertical columns at the side thereof, a post slidable between said columns, a spreader wing hinged upon and suspended from said post, lateral pivotal struts for said wing and fluid actuating means secured upon said columns for raising and lowering said post; substantially as described.

52. The herein described railroad spreader, comprising a car, in combination with parallel vertical columns at the side thereof, a post slidable between said columns, a spreader wing hinged upon and suspended from said post, lateral pivotal struts for said wing and fluid actuating means for raising and lowering said post, said means including a cylinder secured upon said columns; substantially as described.

53. The railroad spreader, comprising a car, in combination with a spreader wing, a fluid pressure cylinder vertically arranged upon said car, a piston rod connected with said wing, a vertical guide containing keyhole openings and a key pin, substantially as described.

54. A railroad spreader comprising a car, in combination with vertically movable spreader wings hinged thereon, angularly positioned wing actuating engines arranged on said car and compound lever connections between said engines and respective wings, substantially as described.

55. In a railroad spreader, an underframe, in combination with a depending continuous brace, columns whereto the ends of the brace are connected, posts guided by said columns and spreader wings hinged upon and supported by said posts, substantially as described.

56. In a railroad spreader, an underframe, in combination with a vertically movable hinged wing thereon, suitable pivotal struts detachably connected to said wing, a superstructure on said underframe, sheaves thereon, chains extending from said struts over said sheaves and a multiple windlass on said super-structure, substantially as described.

57. In a railroad spreader, a car, in combination with a vertically movable horizontal swingable spreader wing thereon, a cylinder fixed on said car, a piston, and piston rod, a cross head and guides, a depending lever pivoted at its upper end and connected with said cross head and a pivotal link connecting said lever to said wing as and for the purpose specified.

58. A railroad spreader comprising a car, in combination with vertical columns arranged at the side thereof, a post slidable between said columns, a spreader wing attached to said post, a cylinder secured to said columns near their upper ends, a piston in said cylinder, and a rigid connection between said piston and said post, substantially as described.

59. A railroad spreader comprising a car, in combination with columns at the side thereof, a post movably guided thereby, a spreader wing attached to said post and a fluid pressure engine secured upon said columns and connected with said post, substantially as described.

60. A railroad spreader comprising a car, in combination with vertically movable spreader wing posts at the sides thereof, a suitable frame wherein said posts are guided, spreader wings attached to said posts, vertically arranged cylinders secured in the upper part of said frame and pistons therein connected with respective posts, substantially as described.

In testimony whereof, I have hereunto set my hand, this 7th day of November, 1906, in the presence of two subscribing witnesses.

OSWALD F. JORDAN.

Witnesses:
CHARLES GILBERT HAWLEY
M. SIMON.